(12) United States Patent
Chaudhary et al.

(10) Patent No.: US 8,056,087 B2
(45) Date of Patent: Nov. 8, 2011

(54) EFFECTIVE USE OF A HARDWARE BARRIER SYNCHRONIZATION REGISTER FOR PROTOCOL SYNCHRONIZATION

(75) Inventors: Piyush Chaudhary, Highland, NY (US); Rama K. Govindaraju, Hopewell Junction, NY (US); Chulho Kim, Poughkeepsie, NY (US); Rajeev Sivaram, West Orange, NJ (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1241 days.

(21) Appl. No.: 11/534,891

(22) Filed: Sep. 25, 2006

(65) Prior Publication Data
US 2008/0077921 A1    Mar. 27, 2008

(51) Int. Cl.
*G06F 9/46* (2006.01)
(52) U.S. Cl. .................................. 718/106; 718/108
(58) Field of Classification Search ................... None
See application file for complete search history.

(56) References Cited

U.S. PATENT DOCUMENTS

| | | | | |
|---|---|---|---|---|
| 7,293,200 B2* | 11/2007 | Neary et al. | | 714/35 |
| 7,512,950 B1* | 3/2009 | Marejka | | 718/106 |
| 7,584,342 B1* | 9/2009 | Nordquist et al. | | 712/22 |
| 7,640,284 B1* | 12/2009 | Goodnight et al. | | 708/404 |
| 7,788,468 B1* | 8/2010 | Nickolls et al. | | 712/22 |
| 2003/0225816 A1* | 12/2003 | Morrow et al. | | 709/107 |
| 2006/0143361 A1* | 6/2006 | Kottapalli et al. | | 711/100 |
| 2006/0212868 A1* | 9/2006 | Takayama et al. | | 718/100 |
| 2006/0230207 A1* | 10/2006 | Finkler | | 710/240 |
| 2007/0074213 A1* | 3/2007 | Ma et al. | | 718/100 |

OTHER PUBLICATIONS

"Using BSR in Communication Protocols," Hanhong Xue, Sep. 26, 2005, pp. 1-4.

* cited by examiner

*Primary Examiner* — Emerson Puente
*Assistant Examiner* — Adam Lee
(74) *Attorney, Agent, or Firm* — Matthew W. Baca, Esq.; Kevin P. Radigan, Esq.; Heslin Rothenberg Farley & Mesisi P.C.

(57) ABSTRACT

A barrier synchronization register, accessible to the nodes in a distributed data processing system, has portions thereof allotted to threads which are present in multiple groups. The barrier synchronization register portion allotted to a given thread has stored therein, over time, group identifier numbers. In this way the state space of a barrier synchronization register is shared over more than one group of process threads.

16 Claims, 2 Drawing Sheets

EFFECTIVE USE OF A HARDWARE BARRIER SYNCHRONIZATION REGISTER FOR PROTOCOL SYNCHRONIZATION

This invention was made with Government support under Agreement No. NBCH3039004 awarded by DARPA. The Government has certain rights in the invention.

TECHNICAL FIELD

The present invention relates in general to the processing of multiple threads on a plurality of processors in a distributed data processing environment. More particularly, the present invention is directed to a method of barrier synchronization to coordinate the activities of various threads which, by their very nature, run to various phases of completion over differing spans of time and which sometime need to communicate with other threads in a task.

BACKGROUND OF THE INVENTION

In general, synchronization happens within a group of communicating threads where all threads need to reach the same synchronization point before any thread can proceed beyond that point. Any given thread is allowed to be in multiple groups, but it can issue only one synchronization for one group at a time. Existing solutions allocate separate state space for each group. This is a straight forward approach but has limitations when used in connection with Barrier Synchronization Register (BSR) hardware which has limited resources in terms of the number of bits available, especially when the number of groups to which a thread belongs is large. The present invention is directed to a solution of this problem.

Parallel processing that distributes work among multiple concurrent processes requires synchronization between processes. One common method of providing this synchronization is via so-called barrier synchronization. By definition, a barrier involves a group of threads. Once a thread enters the barrier, it waits for all other members of the same group to enter the barrier before it exits from the barrier. Threads can also have different organizational structures. For example, a group of threads may have a single central parent or root thread that is responsible for polling to see if all of the children threads have entered the barrier. The threads may also be organized in a tree structure with each thread in the tree being responsible for its children threads. Such trees are not restricted to being binary trees.

Barrier synchronization is typically used in parallel computing environments in which complex numerical applications are being executed. As is known, when an application is processed in a parallel fashion, various jobs for the application are processed in parallel. Barrier synchronization provides a checkpointing mechanism that ensures that each job reaches a particular point before proceeding.

On a cluster of SMP (Symmetric Multi-Processing) data processing systems, barrier synchronization processes are typically divided into two steps. The first step synchronizes participants on the same node and the second step synchronizes all participants across multiple nodes. This division is based on the fact that there are usually faster methods like shared memory and the use of a BSR (barrier synchronization register) to speed up synchronization within a node rather than going through cluster interconnections for off-node synchronization. The present invention focuses on improving the first step of barrier synchronization processes.

Approaches, other than those employed herein, for on-node synchronization employ a shared memory approach. However, the performance of shared memory is subject to the overhead of cache coherence. In part to avoid this problem, the present invention takes advantage of a special-purpose register (BSR or Barrier Synchronization Register) built into the hardware to speed up barrier operations. It is faster than shared memory but, by the very nature of registers, it has a limited size, typically in the range of tens of bytes.

A BSR is best viewed as a distributed register that is accessible by all of the CPUs (Central Processing Units) on a node. Logically, there is only one BSR having a certain number of bytes. Physically, each CPU has a local copy of the BSR. All loads from the BSR are local to the CPU issuing the loads. All stores to the BSR by any CPU are broadcast to all other CPUs. The software is responsible for the correctness of concurrent stores to the same BSR byte. All loads and stores are cache inhibited to avoid cache coherence cost, so as to provide fast synchronization by using the BSR.

One possible way to use the BSR is to assign one BSR byte per thread in synchronization. Each thread puts its own phase number in its BSR byte and polls on other BSR bytes until their values are no less than the phase number, then the phase number can be incremented for the next synchronization. It is noted that while the present invention is described in terms of the use of a special register referred to as a Barrier Synchronization Register, the methods herein are capable of employing any conveniently available an allocatable region of memory.

In general, when a communication protocol MPI (Message Passing Interface), for example, is involved, one thread may belong to multiple groups and barrier synchronization may happen within multiple disjoint groups concurrently. A barrier method based on shared memory can allocate a separate state for each different groups. However, the challenge for using the BSR effectively arises from the limited size of BSR. In order for barrier methods based on using the BSR to be most efficient, the method should be able to handle multiple concurrent barriers and should be able to allow most barrier operations to use the BSR instead of a slower backup method, while only providing a few bits of state information for each participant.

Synchronization in general happens within a group of communicating threads where all threads need to reach the same synchronization point before any thread can proceed beyond. One thread is allowed to be in multiple groups but it can only issue one synchronization for one group at a time. Existing solutions allocate separate state space for each group; this is straightforward but does not work in a limited state space such as with a barrier synchronization register (BSR) when the number of groups threads is large. The present invention solves the synchronization problem using limited state space, yet supports an almost unlimited number of synchronization groups.

SUMMARY OF THE INVENTION

The shortcomings of the prior art are overcome and additional advantages are provided via a method for synchronizing threads in a data processing system. In a first embodiment the threads are organized in a "star" fashion with a single parent (or root) thread and at least one child thread. Upon reaching a point of synchronization by the child threads, a group identifier is stored within a portion of memory allocated to synchronization and a single bit representing a sequence number is toggled. When the parent or root thread reaches a point of synchronization (enters the barrier in the terminology employed herein), this thread polls the portion of memory to determine whether or not each child thread has also entered the barrier. The root thread then stores within the allocated memory for each child thread an indicator signifying release of the child threads.

In order to effectively use the limited size of the BSR, each thread that is going to participate in barrier synchronization is assigned a portion of the BSR to store its state. For a second embodiment, it is assumed that the member threads of a group are logically arranged into a tree hierarchy where a parent thread is in charge of all the child threads in its sub-tree. A barrier operation on the group is logically divided into two phases. Phase one is to gather to the root the information that all threads are in the barrier. Phase two is to release the threads from the barrier. For phase one, the tree structure is used to go from leaves to the root, where a parent thread polls for the states of its child threads and sets a flag in its state to indicate that all the threads in its sub-tree have entered the barrier. For phase two, there are two options. One option is to let the root thread store a release flag to its own state and to let all of the other threads poll for the flag. The other option is to propagate the release from the root thread to leaves using the same tree structure, which means the parent resets the states of its children and the children poll for the reset. When the first option is used for releasing the threads, the group identifier plus a one bit sequence number is stored as the threads' state. When the second option is used, only group id is store as the states.

In accordance with a second embodiment of the present invention in which the threads are organized as a tree with a single root thread and at least two child (or leaf) threads, a slightly different approach is undertaken. In this case, upon reaching a point of synchronization by the root thread, a group identifier for the root thread is stored within a portion of memory allocated to synchronization, and the root thread's children are polled to determine whether or not the root thread's child threads have also reached said point of synchronization and if so, an indicator signifying release of the root thread is stored instead. When each child thread reaches a point of synchronization, a group identifier for the child thread is stored within a portion of memory allocated to synchronization, and the child thread's children are polled to determine whether or not they have also reached a point of synchronization. If so, an indicator signifying release of the thread is stored. Upon release of the root thread, an indicator signifying release of the child threads is stored. This approach does not employ the use of a sequence number but instead typically sets group the group identifier to zero as a means of supplying the release indicator.

In a further characterization of the second embodiment, upon reaching a point of synchronization a non-root thread polls for the states of its child threads, stores the group identifier in its state to indicate that all of the threads in its sub-tree have entered the barrier and are waiting for its parent thread to release it from the barrier. After all of the threads in the group have entered the barrier, the root thread stores "0" in the states of its child threads to indicate that the child threads are released from the barrier. Once a parent thread is released from the barrier, it releases its child threads too by storing "0" in the states of its own child threads.

A third embodiment deals with the situation in which multi-threaded processes occur. The solution to this problem employs an array, BSR[p][t], to represent the m BSR bits that are allocated to thread t of process p.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 2 is a block diagram providing an abstract view of threads from a tree configuration entering a synchronization barrier; and.

DETAILED DESCRIPTION

Although one thread may belong to multiple groups, it can only perform barrier operations on one group at a time, according to the definition of barrier. Therefore, at any given time, it is only necessary to keep one state per thread, which leads to a solution of dividing the BSR evenly for all potential participating threads. To handle multiple group memberships, one thread can use its BSR entry to share a unique identifier for the group on which it is currently performing barrier synchronization.

Suppose each thread has a logical identifier "t" and that it is allocated m bits in the BSR. For example, if m=8, each thread gets one BSR byte. The expression "BSR[t]" is used to represent the share of the BSR that thread t has. Thus, the size of BSR[t] is m bits.

In accordance with the second embodiment of the present invention, a method of BSR use for barrier synchronization is based on a tree topology of the group members. When a group is created, the members are arranged in a logical tree. The method is based on storing a group identifier in thread states and releasing threads with multiple stores. Barrier synchronization for such a group is performed as follows.

TABLE I

Method 2: Tree Structure

```
Barrier_2(group_id)
{
    // wait for all my children to enter the barrier
    foreach (thread t and t is my child) {
        while (BSR[t] != group_id);
    }
    if (this_thread == the root of this group)  {
        off-node synchronization when necessary;
    } else {
        // indicate that all my children and I have
        // entered the barrier
        BSR[this_thread] = group_id;
        // wait for my parent to release me from the
        // barrier
        while (BSR[this_thread] != 0);
    }
    // release all my children from the barrier
```

TABLE I-continued

Method 2: Tree Structure

```
        foreach (thread t and t is my child)   {
            BSR[t] = 0;
        }
    }
```

The method above is able to handle $2^m-1$ groups because each BSR[t] has m bits and the value "0" is used to indicate that a thread is not in a barrier. To complete a barrier on a group of size n, a total of 2(n−1) stores to the BSR are employed: n−1 to indicate that all non-root threads are in the barrier, and n−1 more stores to release the non-root threads from the barrier.

Figure 2:
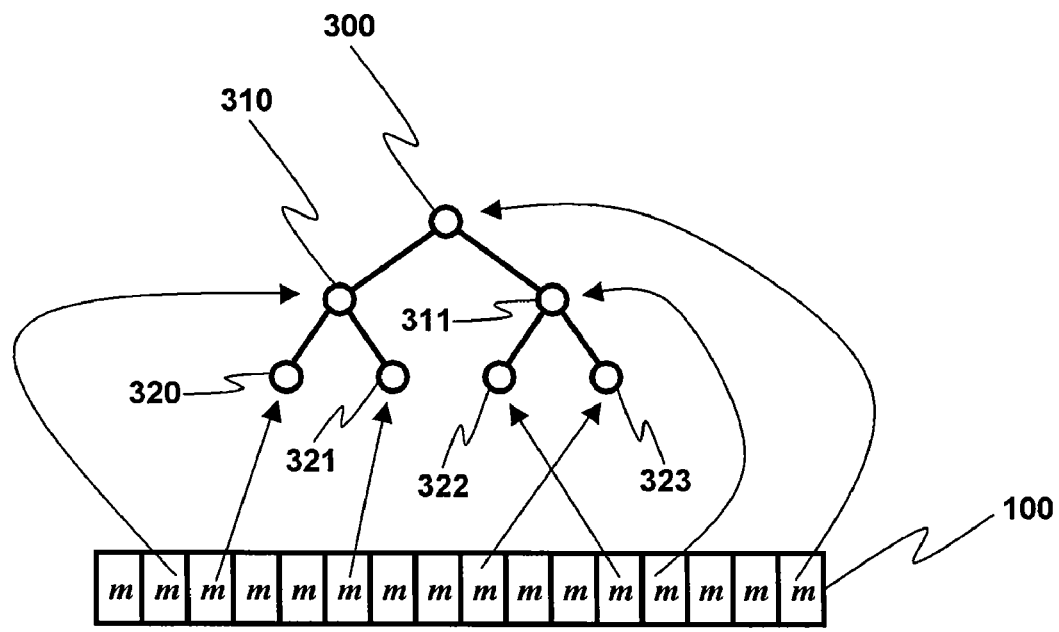

FIG. 2 provides an abstract view of the processing that takes place in a situation in which the threads are structured in tree fashion with root thread 300 and which possesses child threads 310 and 311. In turn child thread 310 possesses its own set of child (grandchild, if you will) threads 320 and 321. Likewise, child thread 311 possesses it own set of child (grandchild, if you will) threads 322 and 323. Each of these threads is associated with a portion of BSR 100. Each of these threads is also capable of storing a group identifier (or an all zero field) into its associated BSR portion.

Since a store to BSR incurs an expensive broadcast from the storing CPU to all other CPUs, it is sometimes desirable to reduce the total number of stores to improve performance. Accordingly, a second method is employed for use with star topology groupings of threads. This method involves storing a group identifier and sequence number as the thread state and releasing threads with a single store.

TABLE II

Method 1: Star Structure

```
Barrier_1(group_id)
{
    // flip barrier sequence number for this group
    seq_no[group_id] = !seq_no[group_id];
    if (this_thread == the center of this group) {
        // wait for all other members to enter the
        // barrier
        foreach (other thread t in this group) {
            while (BSR[t] != (group_id, seq_no));
        }
        off-node synchronization when necessary;
        // release all other members from the barrier
        BSR[this_thread] = (group_id, seq_no) ;
    } else {
        // indicate that I have entered the barrier
        BSR[this_thread] = (group_id, seq_no);
        // wait for the center to release me from the
        // barrier
        while (BSR[center] != (group_id, seq_no));
    }
}
```

The method specified above is a special case of a 1-level tree algorithm, which is optimized by a store to the center task's BSR share (allotted portion) to release all members from the barrier. The one-bit sequence number is to distinguish between consecutive barriers on the same group and, because of this one-bit, only $2^{(m-1)}-1$ groups are supported. The value 0 is reserved for BSR initialization. For a group of size of n, the number of BSR stores is reduced to n, but polling for the members to enter the barrier is serialized at the center process for the star grouping.

Figure 1:
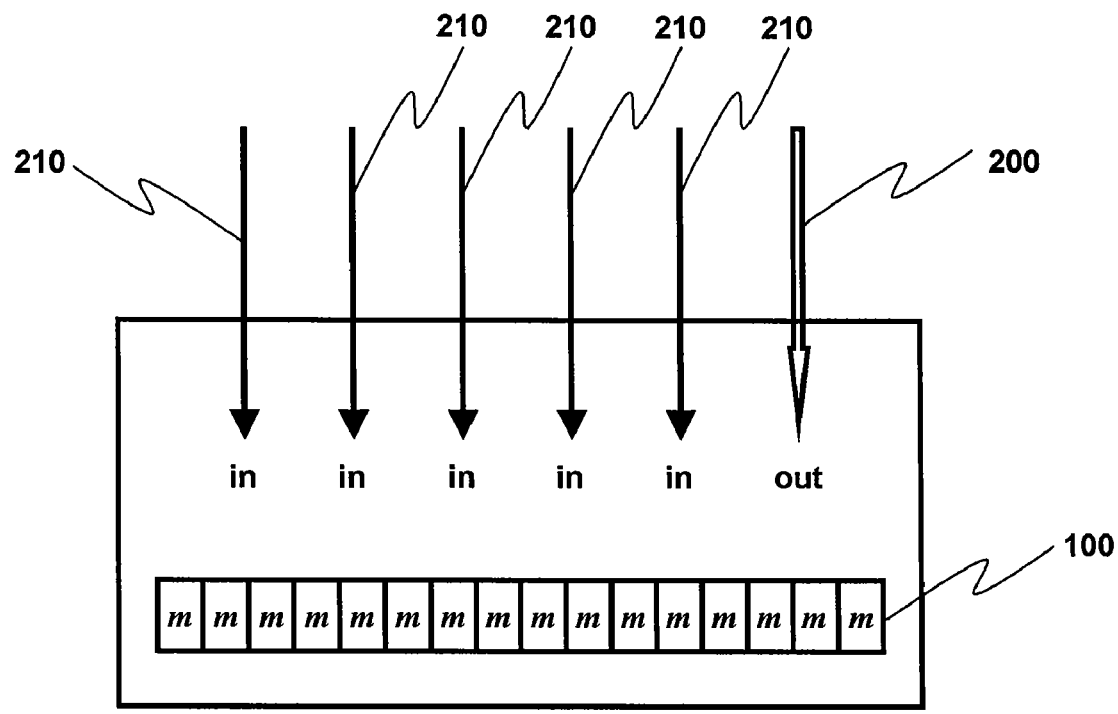
FIG. 1 is a block diagram providing an abstract view of threads from a star configuration entering a synchronization barrier.

FIG. 1 provides an abstract view of the processing that takes place in a situation in which the threads are structured in star fashion. The threads enter the barrier independently. The root or parent thread 200 is responsible for controlling the exit of all of the child threads 210 from the barrier. On entry into the barrier, non-root threads are able to set a flag indicating that they are "in." The root thread 200 is responsible for polling the other threads through BSR 100 and it is thus capable of setting an "out" flag.

Using BSR for MPI Barrier Synchronization

For single-threaded MPI applications, only one thread of an MPI process is allowed to call MPI functions. The above two methods are easily applied to MPI barrier synchronization by mapping MPI communicators to groups. The complication of using BSR for MPI barrier synchronization arises from multi-threaded cases where the participants of an MPI barrier are MPI processes and an MPI process can issue a barrier call from any of its threads.

Complications from using the BSR for the MPI Barrier arise for two reasons:
 (1) The MPI allows barriers on all communicators and there can be a lot of communicators; and,
 (2) a multithreaded MPI task can issue a barrier on a communicator from any thread.

To handle multi-threaded cases, one has to know the maximum number of threads that an MPI process can have and assign m bits to each thread. When an MPI process is waiting in a barrier for other processes to enter the same barrier, it's necessary for the waiting thread to poll all the BSR shares assigned to another process because any thread in the other process can issue a matching barrier call.

Suppose one MPI process "p" has a maximum of T threads that make MPI barrier calls and each thread is logically numbered as t where t ranges from 0 to T−1. To solve this problem, an array "BSR[p] [t]" is used to represent the m BSR bits that are allocated to thread t of process p. When an MPI communicator is created, a tree is built from the participating processes. The tree method above is modified as follows to handle the multi-threaded MPI barrier situation.

TABLE III

Method 3: Synchronizing multi-threaded processes

```
Barrier_3(group_id)
{
    foreach (process p and p is my child) {
        // wait until any of p's thread enters the
        // barrier
        wait for any thread t of process p such that
    BSR[p][t] == group_id;
        // remember which thread has entered the
        // barrier
        thread_in_barrier[p] = t;
    if (this_process == the root of this group) {
        off-node synchronization when necessary;
    } else {
        // indicate that my children and I have
        // entered the barrier
        BSR[this_process][this_thread] = group_id;
        // wait for my parent to release me from the
        // barrier
        while (BSR[this_process][this_thread] != 0);
    }
    // release the participating threads of my
    // children from the barrier
    foreach (process p and p is my child) {
        BSR[p][thread_in_barrier[p]] = 0;
    }
}
```

Figure 3:
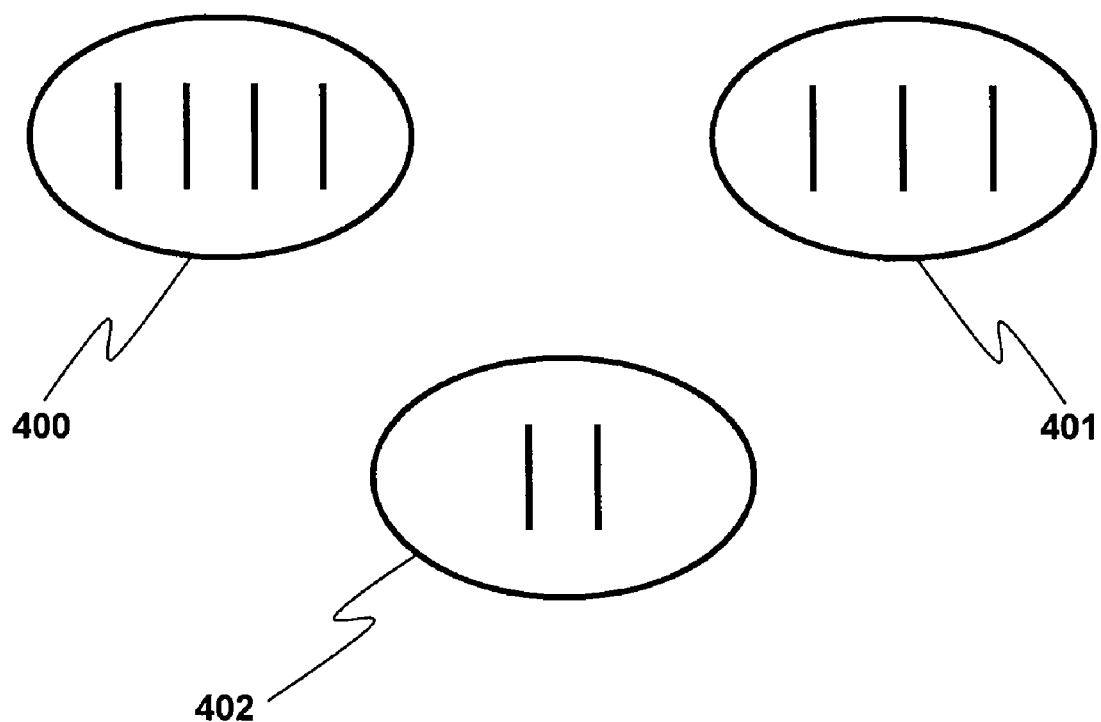
FIG. 3 is a block diagram illustrating the situation in which a process includes multiple threads.

This modified algorithm is still able to handle $2^m-1$ groups and it still requires $2(n-1)$ BSR stores to complete a barrier on a group of size n. To reduce the overhead in polling the states of multiple threads, advantage is taken of the multi-byte load capability of the BSR. This method requires that the protocol know the maximum number of MPI threads in a process, which is specified by a user. This situation is illustrated in FIG. 3 in which process 400 is seen to have 4 threads; process 401 is seen to have 3 threads and process 402 is seen to have two threads. Method 2 is a special case of Method 3 with only one thread per process.

This solution suggests that the protocol know the maximum number of MPI threads in a task, which is specified by the user, for example through the specification of an environment variable.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method to facilitate synchronizing threads belonging to multiple barrier synchronization groups in a data processing system, said threads comprising a single parent thread and at least one child thread, the single parent thread and the at least one child thread being members of a particular barrier synchronization group, said method comprising:

upon reaching a point of barrier synchronization for a current barrier synchronization of the particular barrier synchronization group by said at least one child thread, storing, within a portion of memory allocated to synchronization, a group identifier for said at least one child thread, the group identifier uniquely identifying the particular barrier synchronization group, wherein the point of barrier synchronization is a point to be reached by all members of the particular barrier synchronization group during the current barrier synchronization of the particular barrier synchronization group, wherein the storing indicates that the point of barrier synchronization has been reached by the at least one child thread for the particular barrier synchronization group, and toggling a portion of said allocated memory representing a sequence number, the sequence number distinguishing between the current barrier synchronization of the particular barrier synchronization group and a previous barrier synchronization of the members of the particular barrier synchronization group, wherein one child thread of, the at least one child thread is a member of multiple barrier synchronization groups and the one child thread stores, within the portion of memory allocated to synchronization, the group identifier uniquely identifying the particular barrier synchronization group for which the one child thread has reached the point of barrier synchronization to distinguish that barrier synchronization of the particular barrier synchronization group from one or more barrier synchronizations of one or more other barrier synchronization groups of the multiple barrier synchronization groups of which the one child thread is a member;

upon reaching the point of barrier synchronization by said single parent thread, polling said portion of allocated memory to determine that each child thread of the at least one child thread has reached said point of synchronization; and storing within said allocated memory an indicator indicating release of any said child thread.

2. The method of claim 1 in which said sequence number is one bit in length.

3. The method of claim 1 in which said allocated memory is a barrier synchronization register accessible to a plurality of CPU's on a data processing node.

4. A method to facilitate synchronizing threads belonging to multiple barrier synchronization groups in a data processing system, said threads being organized in a tree structure with a single root thread and at least one child thread of the root thread, the single root thread and the at least one child thread being members of a particular barrier synchronization group, said method comprising:

for each child thread of said at least one child thread, upon reaching a point of barrier synchronization for a current barrier synchronization of the particular barrier synchronization group by said child thread, storing, within a portion of memory allocated to synchronization, a group identifier for said child thread, the group identifier uniquely identifying the particular barrier synchronization group, wherein the point of barrier synchronization is a point to be reached by all members of the particular barrier synchronization group during the current barrier synchronization of the particular barrier synchronization group, wherein the storing indicates that the point of barrier synchronization has been reached by the child thread for the particular barrier synchronization group, wherein one child thread of the at least one child thread is a member of multiple barrier synchronization groups and the one child thread stores, within the portion of memory allocated to synchronization, the group identifier uniquely identifying the particular barrier synchronization group for which the one child thread has reached a point of barrier synchronization to distinguish that barrier synchronization of the particular barrier synchronization group from one or more barrier synchronizations of one or more other barrier synchronization groups of the multiple barrier synchronization groups of which the one child thread is a member;

upon reaching a point of synchronization of said root thread, storing an indicator signifying release of said at least one child thread; and for each child thread of said at least one child thread, storing an indicator signifying release of any children threads of said child thread.

5. The method of claim 4 in which said indicator signifying release is an all zero bit field in said allocated memory.

6. The method of claim 4 in which said allocated memory is a barrier synchronization register accessible to a plurality of CPU's on a data processing node.

7. A method for synchronizing multiple processes in a data processing system, said multiple processes comprising threads belonging to multiple barrier synchronization groups with at least one thread of each process of the multiple processes being a member of a particular barrier synchronization group, said multiple processes being organized in a tree structure with a root process and at least one child process of the root process, and wherein at least one process of the multiple processes including multiple threads, said method comprising:

for each child process of said at least one child process, upon reaching a point of barrier synchronization for a current barrier synchronization of the particular barrier synchronization group by a thread of the child process, storing, within a portion of memory allocated to synchronization, a group identifier for said child process, the group identifier uniquely identifying the particular barrier synchronization group, wherein the point of barrier synchronization is a point to be reached by all members of the particular barrier synchronization group during barrier synchronization of the particular barrier synchronization group and wherein the storing indicates that the point of barrier synchronization has been reached by the thread of the child process for the particular barrier synchronization group, wherein one child process of the at least one child process comprises a thread which is a member of multiple barrier synchronization groups and the one child process stores, within the portion of memory allocated to synchronization, the group identifier uniquely identifying the particular barrier synchronization group for which the thread of the one child process has reached the point of barrier synchronization to distinguish that barrier synchronization of the particular barrier synchronization group from one or more barrier synchronizations of one or more other barrier synchronization groups of the multiple barrier synchronization groups of which the thread of the one child process is a member;

upon reaching a point of synchronization of said root process, storing an indicator signifying release of said at least one child process; and for each child process of said at least one child processes, storing an indicator signifying release of any children processes of said child process.

8. The method of claim 7 in which said indicator signifying release is an all zero bit field in said allocated memory.

9. The method of claim 7 in which said allocated memory is a barrier synchronization register accessible to a plurality of CPU's on a data processing node.

10. The method of claim 3, wherein each thread belonging to one or more barrier synchronization groups of the multiple barrier synchronization groups is allotted a separate portion of the barrier synchronization register, the separate portion allotted to a particular thread being used by the particular thread, when participating in a barrier synchronization of any barrier synchronization group of which the particular thread is a member, to indicate reaching a point of barrier synchronization, regardless of the barrier synchronization group for which the particular thread is participating in a barrier synchronization.

11. The method of claim 10, wherein a child thread of the at least one child thread indicates in its allotted portion of the barrier synchronization register having reached a point of synchronization for any barrier synchronization in which the child thread participates.

12. A computer system facilitating synchronizing threads belonging to multiple barrier synchronization groups, the threads comprising a single parent thread and at least one child thread, the single parent thread and the at least one child thread being members of a particular synchronization group, the computer system comprising:

a memory; and a processor, in communications with the memory, wherein the computer system is configured to perform a method, the method comprising:

upon reaching a point of barrier synchronization for a current barrier synchronization of the particular barrier synchronization group by the at least one child thread, storing, within a portion of memory allocated to synchronization, a group identifier for the at least one child thread, the group identifier uniquely identifying the particular barrier synchronization group, wherein the point of barrier synchronization is a point to be reached by all members of the particular barrier synchronization group during the current barrier synchronization of the particular barrier synchronization group, wherein the storing indicates that the point of barrier synchronization had been reached by the at least one child thread for the particular barrier synchronization group, and toggling a portion of the allocated memory representing a sequence number, the sequence number distinguishing between the current barrier synchronization of the particular barrier synchronization group and a previous barrier synchronization of the members of the particular barrier synchronization group, wherein one child thread of the at least one child thread is a member of multiple barrier synchronization groups and the one child thread stores, within the portion of memory allocated to synchronization, the group identifier uniquely identifying the particular barrier synchronization group for which the one child thread has reached the point of barrier synchronization to distinguish that barrier synchronization of the particular barrier synchronization group from one or more barrier synchronizations of one or more other barrier synchronization groups of the multiple barrier synchronization groups of which the one child thread is a member;

upon reaching the point of barrier synchronization by the single parent thread, polling the portion of allocated memory to determine that each child thread of the at least one child thread has reached the point of synchronization; and storing within the allocated memory an indicator indicating release of any said child thread.

13. The computer system of claim 12 in which the sequence number is one bit in length.

14. The computer system of claim 12 in which the allocated memory is a barrier synchronization register accessible to a plurality of CPU's on a data processing node.

15. The computer system of claim 12, wherein each thread belonging to one or more barrier synchronization groups of the multiple barrier synchronization groups is allotted a separate portion of the barrier synchronization register, the separate portion allotted to a particular thread being used by the particular thread, when participating in a barrier synchronization of any barrier synchronization group of which the particular thread is a member, to indicate reaching a point of barrier synchronization, regardless of the barrier synchronization group for which the particular thread is participating in a barrier synchronization.

16. The computer system of claim 15, wherein a child thread of the at least one child thread indicates in its allotted portion of the barrier synchronization register having reached a point of synchronization for any barrier synchronization in which the child thread participates.

* * * * *